(12) United States Patent
Lochbihler

(10) Patent No.: US 9,188,716 B2
(45) Date of Patent: Nov. 17, 2015

(54) REFLECTIVE SECURITY ELEMENT FOR SECURITY PAPERS, VALUE DOCUMENTS OR THE LIKE

(75) Inventor: Hans Lochbihler, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 357 days.

(21) Appl. No.: 13/989,526

(22) PCT Filed: Nov. 18, 2011

(86) PCT No.: PCT/EP2011/005821
§ 371 (c)(1),
(2), (4) Date: May 24, 2013

(87) PCT Pub. No.: WO2012/069163
PCT Pub. Date: May 31, 2012

(65) Prior Publication Data
US 2013/0250419 A1 Sep. 26, 2013

(30) Foreign Application Priority Data
Nov. 26, 2010 (DE) .......................... 10 2010 052 665

(51) Int. Cl.
| | |
|---|---|
| *G02B 5/136* | (2006.01) |
| *B44F 1/02* | (2006.01) |
| *B44F 1/10* | (2006.01) |
| *G02B 5/124* | (2006.01) |
| *B05D 5/06* | (2006.01) |
| *B42D 25/29* | (2014.01) |
| *B42D 25/324* | (2014.01) |

(52) U.S. Cl.
CPC ................ *G02B 5/136* (2013.01); *B05D 5/065* (2013.01); *B42D 25/29* (2014.10); *B44F 1/02* (2013.01); *B44F 1/10* (2013.01); *G02B 5/124* (2013.01); *B42D 25/324* (2014.10); *B42D 2033/18* (2013.01); *B42D 2033/20* (2013.01); *B42D 2035/24* (2013.01); *B42D 2035/44* (2013.01)

(58) Field of Classification Search
CPC ............... B42D 25/29; B42D 2035/24; B42D 2033/18; B42D 25/324; B42D 2035/44; B42D 2033/20; G02B 5/12; G02B 5/136; B05D 5/065; B44F 1/02; B44F 1/104
USPC .................. 359/515, 529–530, 546, 534–542
See application file for complete search history.

(56) References Cited

U.S. PATENT DOCUMENTS

| | | |
|---|---|---|
| 3,712,706 A | 1/1973 | Stamm |
| 4,575,125 A | 3/1986 | Augier |

(Continued)

FOREIGN PATENT DOCUMENTS

| | | |
|---|---|---|
| EP | 0 146 325 A2 | 6/1985 |
| EP | 0 905 530 A2 | 3/1999 |

(Continued)

OTHER PUBLICATIONS

M. Kolle, et al.; "Mimicking the colourful wing scale structure of the Papilio blumei butterfly" Nature Nanotechnology Letters, DOI: 10.1038/NNANO.2010.101, (May 30, 2010).

*Primary Examiner* — James Phan
(74) *Attorney, Agent, or Firm* — Workman Nydegger

(57) ABSTRACT

A security element for manufacturing value documents, such as bank notes, checks or the like, has an upper side on which there is formed a microcavity structure that has a multiplicity of adjacent microcavities configured as retroreflectors, wherein on the microcavities there is formed a structure causing a color effect. The microcavities are respectively configured such that they have a first region in which radiation incident on the upper side is singly reflected, and a second region in which radiation incident on the upper side is multiply reflected. The structure causing the color effect has a dispersion dependent on the angle of incidence, so that radiation singly reflected at the first region shows a different color effect, when viewed from the upper side, than radiation multiply reflected at the second region.

17 Claims, 6 Drawing Sheets

(56) References Cited

U.S. PATENT DOCUMENTS

| | | |
|---|---|---|
| 7,145,723 B2 | 12/2006 | Tompkin et al. |
| 2007/0098959 A1 | 5/2007 | Lieberman |
| 2014/0353959 A1* | 12/2014 | Lochbihler .............. G02B 5/08 283/85 |

FOREIGN PATENT DOCUMENTS

| | | |
|---|---|---|
| EP | 1 434 695 B1 | 2/2005 |
| WO | 00/72275 A1 | 11/2000 |
| WO | 2005/066667 A1 | 7/2005 |
| WO | 2009/105142 A2 | 8/2009 |

\* cited by examiner

REFLECTIVE SECURITY ELEMENT FOR SECURITY PAPERS, VALUE DOCUMENTS OR THE LIKE

BACKGROUND OF THE INVENTION

Field of the Invention

The invention relates to a security element for the manufacturing of value documents, such as bank notes, checks or the like, which has an upper side on which there is formed a microcavity structure that has a multiplicity of adjacent microcavities configured as retroreflectors, on the microcavities there being formed a structure causing a color effect.

The invention further relates to a value document having such a security element.

The invention relates to a manufacturing method for a security element for value documents, such as bank notes, checks or the like, wherein there is made available a substrate that has an upper side, on the upper side there is formed a microcavity structure that has a multiplicity of adjacent microcavities configured as retroreflectors, and on the microcavities there is formed a structure causing a color effect.

For security elements it is known to provide retroreflectors. Such retroreflectors have a great angular tolerance in light reflection and surfaces equipped therewith appear brighter to a viewer than smooth mirroring surfaces. These reflect light only at their glancing angle, and a smooth reflective sample appears bright when the illumination source is mirrored in the eye of the viewer or the light reaches the eye of the viewer via scattering at the environment. If this condition is not fulfilled, the surface appears dark. The visual impression of such a surface thus depends very strongly on the type and the position of the illumination source and on the angle between illumination source and viewer.

There are known retroreflectors that return the incident light in its direction of incidence very efficiently. They are used for example in road boundary posts or road signs. Certain tetrahedrally structured surfaces show a high light yield in a relatively large angular range, by way of example reference is made to U.S. Pat. No. 3,712,706.

It is also known to form retroreflectors by means of spherical balls that are provided with an interference coating, see WO 2009/105142 A2. The coating of these spherical balls, which are also referred to as microspheres, can be designed such that a color-shift effect occurs at the reflected radiation. This makes it possible for the color of the reflected light to be altered compared to the color of the incident light, as it is described for example in WO 2005/066667 A1.

There were also proposed retroreflectors, in which a part of the incident light undergoes a phase shift, whereby, likewise, the color of the reflected light is altered (see EP 0905530 A2).

Retroreflectors having identical three-dimensional structure elements that possess side areas inclined by 45° relative to the surface are described in EP 1434695 B1 for the realization of machine-readable optical features.

It is also possible for retroreflectors to be vapor-deposited with dielectric multilayer structures, which show color mixture in the reflection (see M. Kolle et al., "Mimicking the colorful wing scale structure of the Papilio blumei butterfly", Nature Nanotechnology Letters, DOI: 10.1038/NNANO.2010.101, 2010).

EP 146325 A2 finally describes a security element of the above-mentioned type, which has a retroreflector structure that is built from tetrahedrons. The side areas of the tetrahedrons are provided with a fine structure, which causes an alteration of the color or of the polarization of the incident light upon the reflection.

The invention is based on the object to develop such a security element with respect to its forgery resistance.

SUMMARY OF THE INVENTION

This object is achieved with a security element of the above-mentioned type, in which the microcavities are respectively configured such that they have a first region in which radiation incident on the upper side is singly reflected, and a second region in which radiation incident on the upper side is multiply reflected, wherein the structure causing the color effect has a dispersion dependent on the angle of incidence, so that radiation singly reflected at the first region causes a different color effect, when viewed from the upper side, than radiation reflected at the second region.

This object is further achieved with a manufacturing method of the above-mentioned type, in which the microcavities are respectively configured such that they have a first region in which radiation incident on the upper side is singly reflected, and a second region in which radiation incident on the upper side is multiply reflected, wherein the structure causing the color effect is provided with a dispersion dependent on the angle of incidence, so that radiation singly reflected at the first region causes a different color effect, when viewed from the upper side, than radiation multiply reflected at the second region.

This object is finally also achieved with a value document that has a security element according to the invention.

The microcavity structure thus has retroreflectors that comprise two regions, which respectively on their own retroreflect the radiation. In so doing, the incident light is reflected singly in the first region of each microcavity and multiply, normally twice, in the second region, which normally is formed through the remaining region of the microcavity. If, for example, the microcavities are configured as spherical microcavities, in the center of the sphere the incident light is thrown back in the beam source direction through a single reflection. Radiation impinging at the edge of the sphere, however, is deflected to the opposite edge and from there reflected back to the beam source.

By "retroreflection" there is to be understood here a throwing back of the incident radiation in the direction of incidence. This property is given over a certain region of the angle of incidence, e.g. ±10° or more.

In the two regions the radiation thus impinges with different angles on the surface of the microcavity. In the first region in which only one reflection takes place, the radiation impinges on the surface largely perpendicular. In the second region, typically with an angle of incidence of at least 45°. Since the dispersion of the structure causing the color effect depends on the angle of incidence, in the two regions there now ensues a different color effect. Usual color-shift coatings show different colors upon a variation of the viewing angle, i. e. the angle of incidence of the radiation on the coating. At a perpendicular angle of incidence, such a coating shows a certain color, which is altered upon the tilting of the area, i.e. with the variation of the angle of incidence. Known color-shift coatings have for example a semi-transparent metal layer, a metallic mirror layer and in between a dielectric spacer layer.

There thus results a high color contrast between the two regions. In the first regions, in which a single reflection of the radiation takes place, there ensues a color effect that significantly differs from that of the second regions, in which the radiation is multiply reflected and thus impinges at different angles of incidence on the surface.

The configuration of the regions, in particular their geometry that they have in a top view of the surface, now substantially depends on the type of depression of the microcavities. The dimension of the microcavities in plan view as well as their depth, i.e. their extension perpendicular to the surface, have an impact on the size of the regions. A variation of the depth alters the area ratio of first and second region.

The individual areas of these two regions are preferably chosen so small that they cannot be resolved by a viewer. Then, a viewer perceives these regions laterally arranged side by side as a mixed color. Through the variation of the area of these adjacent regions, a mixed color can thus be chosen almost steplessly between the two present basic colors in the regions of the single and the regions of the multiple reflection.

If the structure width or the grid width of the individual microcavities are formed in a size between 2 μm and 300 μm, an individual microcavity is not optically resolved by the unarmed eye, but appears as an individual color pixel. Depending on the area ratio of first and second region of a pixel, there thus results a different mixed color, which for each pixel is mixed from the color that ensues in the first region, and the color that the second region causes. The variation of the depth of the depression of each microcavity adjusts the area portion and thus the mixed color. For the design of a security element it is preferred to provide different forms of microcavities and to therewith adjust the color with which the individual microcavities or pixels are perceived. From a manufacturing point of view it is remarkable here that the surface coating for the microcavities does not have to be altered. It can be identical, and nevertheless there is achieved a different color impression for microcavities with different depressions.

The geometry of the depressions here is in no way limited to rotationally symmetric forms or forms which in plan view have a circular outline. Aspheres or freeform areas, as they are known e.g. from lamp reflectors, can be employed. In particular, there can also be employed channel-shaped depressions, which have for example the form of a semicylinder, which is curved only in one sectional plane, in the other, however, is longitudinally extended. Such asymmetrically configured microcavities at the same time have a polarization effect for the radiation multiply reflected in the second region. TM-polarized light at an oblique angle of incidence shows in general a lower reflection than TE-polarized radiation. This can be exploited for a color effect, since the structure shows different color, when the reflected light is viewed through a polarizer. The color alters, when the polarizer is rotated.

If in the microcavity structure there are employed microcavities which in only one spatial plane cause a retroreflective radiation deflection, one receives a multiplicity of optical design possibilities. For example, a two-color pattern is possible, which upon a rotation of the pattern in the image plane by 90° exchanges its colors. For this purpose, the pattern and its background must differ with respect to the main direction, along which the non-rotationally symmetric microcavities extend. The pattern and its background thus form two districts. In a first orientation, the pattern appears in a first color and the background in a second, for example the pattern in blue and the background in yellow. If the security element is now rotated in the image plane, i.e. if it rotates around the optical axis of viewing, the colors exchange and the pattern appears in the second color, the background, on the other hand, in the first.

Such effects are already known for other structures, which, however, require high-refractive coatings of subwavelength gratings and thus a high manufacturing expense. The construction of such an effect by means of a microcavity structure, which realizes a multiplicity of retroreflectors, however, is very much easier to manufacture and moreover of a higher contrast. On account of the light-focussing effect of the retroreflectors, the color intensity of the change is significantly higher and can thus be easier perceived by a viewer. A higher forgery resistance for a security element with and at the same time easier manufacturing is the result.

The structures that are retroreflective in only one direction can, of course, also be configured as pixels, i.e. their extent does not exceed 300 μm in any direction. The orientation and/or geometry of the structures can then be individually different for each pixel.

When a semi-transparent or even purely dielectric coating is chosen for the structure causing the color effect, also translucence can be used as an optical effect in order to mark the security element. If such a pattern is applied on a previously printed area, the printing area is well recognizable from those angles from which no retroreflection takes place to the viewer. Upon viewing the pattern from the angular range of retroreflection, however, the pattern of the retroreflector dominates, and the printing area therebehind is not visible or only with difficulties.

The above mentioned color change between motif and background is formed particularly strong, when the main axes of the non-rotationally symmetric microcavities are perpendicular to each another. Different orientations of non-rotationally symmetric microcavities are not limited to this, however. By a continuous variation of the orientation of the main direction of the non-rotationally symmetric microcavities there can also be realized pump and run effects. Such movement patterns attract a viewer's special attention and are therefore particularly suitable as easily recognizable features for the authentication of a security element. Upon the tilting of such patterns, there arise laterally movable color alterations in the structures formed by the microcavities.

Further, through non-rotationally symmetric microcavities having different orientations there can also be realized effects that a viewer perceives as three-dimensional objects. For this purpose, the height information or the distance of the object to be reproduced to the viewer can be coded by the orientation angle of such microcavities. In this case, a viewer perceives a laterally different parallax in the planar surface structured with microcavities. The spatial impression can be enhanced by additionally varying, upon the manufacture of the retroreflector, the structure depth of the microcavities as a function of height or of reflection properties of the object. A spatial impression can also be achieved, when the intensity profile of the object is implemented pixel by pixel in such microcavities having coded orientation angle.

Finally, the cross-section of the channel-shaped microcavities is not limited to symmetric geometries. Asymmetric geometries can produce a light concentration in the direction of a viewer through a 'Blaze' effect. This can increase the light yield perceived by the viewer.

For the manufacturing method according to the invention, in particular direct exposure techniques, e.g. with the aid of a laserwriter, come into consideration. The manufacturing can be performed analogously to the known manufacturing methods for microlenses. The original of the microcavity structure is written into a substrate coated with photoresist with the aid of a laserwriter via direct exposure and subsequently the exposed portion of the photoresist is removed. An exposed original can subsequently be electroformed and thus an embossing stamp can be produced. Ultimately, the structure is replicated for example in UV lacquer on foil via an embossing process. Alternatively, a nanoimprint method can be used. This photolithographic manufacturing method offers many design possibilities upon the choice of the geometry of the microcavities. There can thus be realized, without additional effort, also non-rotationally symmetric or non-spherical geometries of microcavities.

Subsequently, there is performed a vapor deposition of the surface with the structure causing the color effect, for example a color-shift coating. For this purpose, among other things, electron beam vapor deposition, sputtering or thermal evaporation under vacuum come into consideration. Finally, the structure is laminated for protection, preferably with a cover layer.

The structure depth lies in an order of magnitude of half the structure width. Since in many applications it is undesirable to exceed a maximum thickness of the security element, structure widths smaller than 30 µm are preferred so as to keep the thickness of the security element as small as possible. A lower limit for the structure width lies at about 2 µm, which is due to the diffraction behavior of the light on structures in the order of magnitude of the wavelength. Because for smaller structure widths the scattering or diffraction portions of the reflected light increase, which is why the portion of the mirroringly or specularly retroreflected light decreases. Furthermore, the structure width of the microcavities is preferably chosen such that an individual cavity cannot be resolved by the viewer and thus a color mixture effect arises between the different color regions.

The microcavities according to the invention can be arranged periodically or aperiodically. In case of a periodic arrangement of the microcavities, the structure additionally acts as a diffraction grating and a viewer perceives, in particular with a structure width or period of less than 10 µm, individual diffraction orders. The two effects of retroreflection and of grating diffraction can be advantageously combined in one security feature. It is also possible, however, to bring the effect of grating diffraction to disappear through the corresponding design of the structure. For this purpose, the positions of the individual microcavities must be arranged randomly, i.e. randomly distributed around their target positions. Thus, the individual reflected light beams no longer overlap constructively and the grating diffraction is suppressed. In return, the portion of the retroreflected light increases.

The security element can be configured in particular as a security thread, tear thread, security band, security strip, patch or as a label. In particular, the security element can span transparent regions or recesses.

The security element can be in particular part of a precursor to a value document yet unfit for circulation, which besides the security element according to the invention can have for example also further authenticity features (such as e.g. luminescence substances provided in the volume). Value documents here are understood to be, on the one hand, documents having the security element. On the other hand, value documents can also be other documents and objects that can be provided with the security feature according to the invention in order for the value documents to have uncopiable authenticity features, thereby making it possible to check authenticity and at the same time preventing unwanted copies. Chip or security cards, such as e.g. bank or credit cards, are further examples of a value document.

The manufacturing method according to the invention can be developed such that the described preferred forms and embodiments of the security element are manufactured.

It is evident that the features mentioned hereinabove and those to be explained hereinafter are usable not only in the stated combinations, but also in other combinations or in isolation, without going beyond the scope of the present invention. In particular, in all the embodiments described hitherto in general and hereinafter in detail one can do without the feature of the perforation.

BRIEF DESCRIPTION OF THE DRAWINGS

Hereinafter the invention will be explained more closely by way of example with reference to the attached drawings, which also disclose features essential to the invention. There are shown.

DETAILED DESCRIPTION OF PREFERRED EMBODIMENTS

Figure 1:
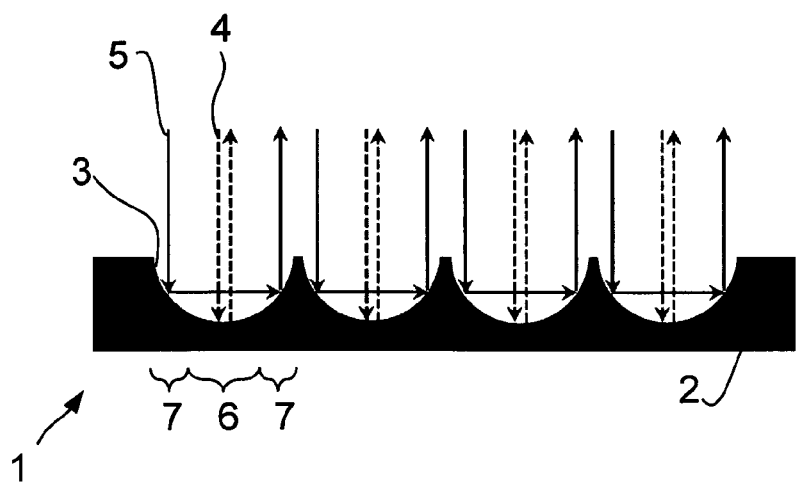
FIG. 1 a schematic representation through a microcavity structure, as it is used in a first embodiment of a security element, FIG. 2 a schematic representation similar to that of FIG. 1, but for a different viewing direction, FIG. 3 a diagram for illustrating the first and second regions in the microcavities of the microcavity structure of FIG. 1 and FIG. 2, FIG. 4 a schematic sectional representation of a security element that employs the microcavity structure of FIG. 1, FIG. 5 to 7 schematic sectional representations of further security elements similar to that of FIG. 4, FIG. 8 a plan view of the microcavity structure of the security element of FIG. 4, FIG. 9 a schematic sectional representation of a further embodiment of a security element, FIG. 10 a plan view of the microcavity structure of the security element of FIG. 9, FIG. 11 a plan view of a microcavity structure of a further embodiment of a security element, FIG. 12 to 14 schematic representations of further security elements, which contain the microcavity structure of FIG. 11, and FIG. 15 a plan view of a further microcavity structure for a security element.
Figure 2:
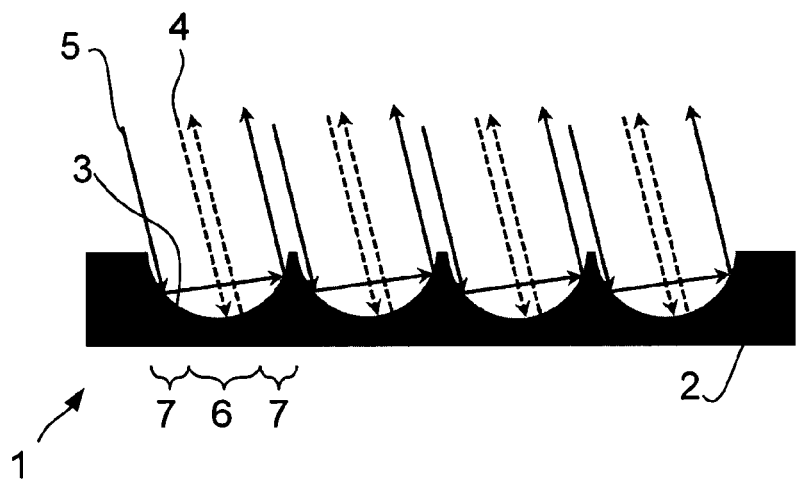

FIG. 1 schematically shows a sectional representation through a retroreflective microcavity structure 1 which is formed in a substrate. On its upper side, this substrate has several microcavities 3, which in the shown case are configured as spherical depressions. The depressions are executed reflectively, for example through a suitable coating (not shown). The microcavities 3 act as retroreflectors, i.e. they throw back radiation (e.g. light) in the direction of incidence. FIG. 1 shows the case of an incidence of radiation perpendicular to the surface of the substrate 2, FIG. 2 the situation for an oblique incidence.

Radiation 4 incident in the center of each microcavity 3 is thrown back to the radiation source by single reflection. Radiation 5 incident at the edge of the microcavity 3, however, is deflected twice in the microcavity 3 and then reflected in the direction of the radiation source. Thus, there are two regions 6, 7 in the microcavity 3. Radiation incident in a first region 6 is directly reflected. In a second region 7, which in plan view of the surface annularly surrounds the first region 6, the radiation is deflected twice, however.

Figure 3:
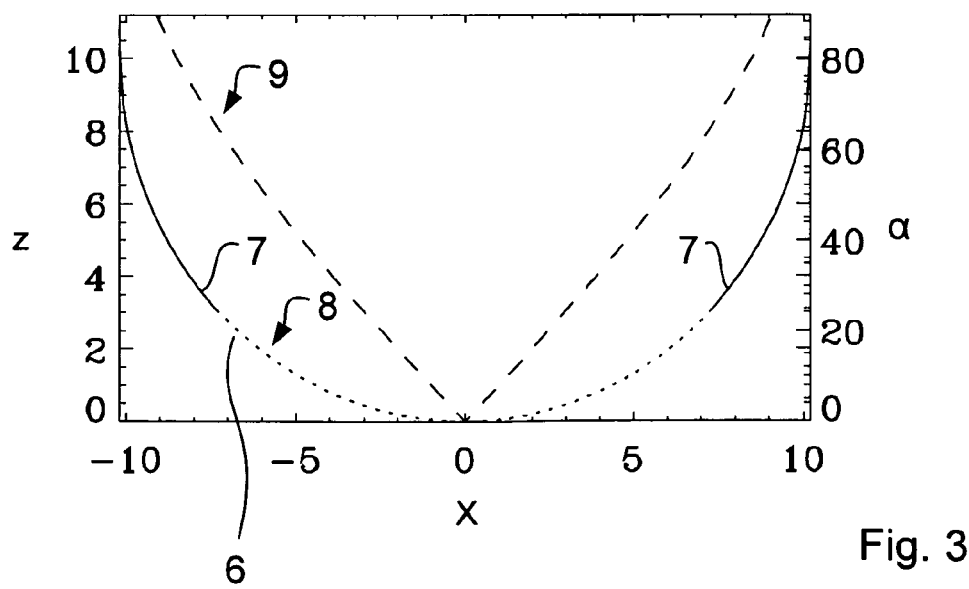

The regions 6 and 7 differ, however, primarily with respect to the angle of impingement at which the radiation impinges on the boundary area of each microcavity 3. This is schematically represented in FIG. 3, which shows a cross section through a spherical microcavity 3. On the x-axis the radial coordinate is plotted. On the z-axis the height coordinate. The curve 8 shows the surface of the microcavity 3. In the region 6 this surface is symbolized by a dashed line, in the region 7 by a continuous line. It is well recognizable that at the radial coordinates between −7 and +7 the first region 6 is present—radiation incident there is thus reflected only once. Radiation incident at greater radial coordinates, however, is reflected twice. The impact on the angle of impingement is shown by curve 9, for which the right vertical axis applies at which the angle α is plotted, at which the radiation impinges on the surface of the microcavity 3. It can be clearly seen that the doubly reflected radiation, i.e. radiation that is incident in the second region 7, impinges at an angle of about 45° and greater on the surface.

For good order's sake it is pointed out that FIG. 3 reproduces the situation for a perpendicular incidence of the radiation. For oblique angles of incidence, the respective regions are somewhat shifted from the symmetry axis. The districts 7 with double beam reflection are present for a great range of angles of incidence, however.

Figure 4:
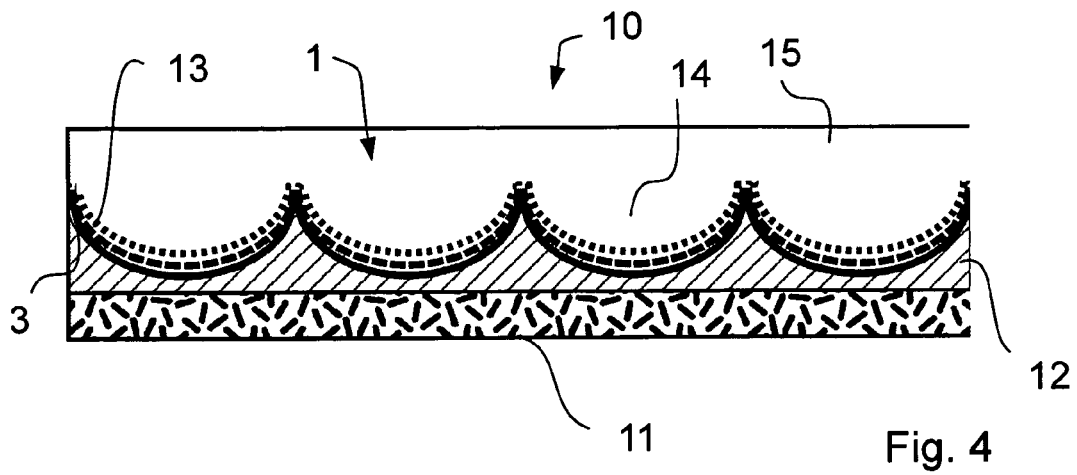

The regions 6, 7, which differ with respect to the angle of impingement a with which the ultimately retroreflected radiation impinges on the surface of the microcavity 3, cooperate with a layer structure 13, which is applied on the surface of the microcavities 3. This is recognizable in FIG. 4, which shows a sectional representation of a security element 10 in a first embodiment. The security element 10 is built up on a substrate 11, whereon an embossing lacquer 12 is applied. Into this embossing lacquer 12 there is formed, as already previously explained in the general part of the description, the microcavity structure 1, which has a multiplicity of adjacent microcavities 3. On the surfaces of the microcavities 3 there is applied the layer structure 13, the substantial feature of which is a dispersion dependent on the angle of incidence. The layer structure 13 therefore causes a color effect still to be explained. It can be executed, for example, as a known color-shift coating. Such coatings usually consist of a semi-transparent metal layer, a metallic mirror layer and a dielectric spacer layer located in between. They reflect light with a color that depends on the angle of incidence with which the radiation impinges on the coating. Such color-shift coatings are known for planar areas, which show a rainbow-like color effect when they are tilted upon viewing.

Above the such coated microcavity 3 there is applied a cover layer, which both fills the microcavities 3 at 14 and also planarly covers the microcavity structure 1 by means of a superjacent section 15.

Figure 5:
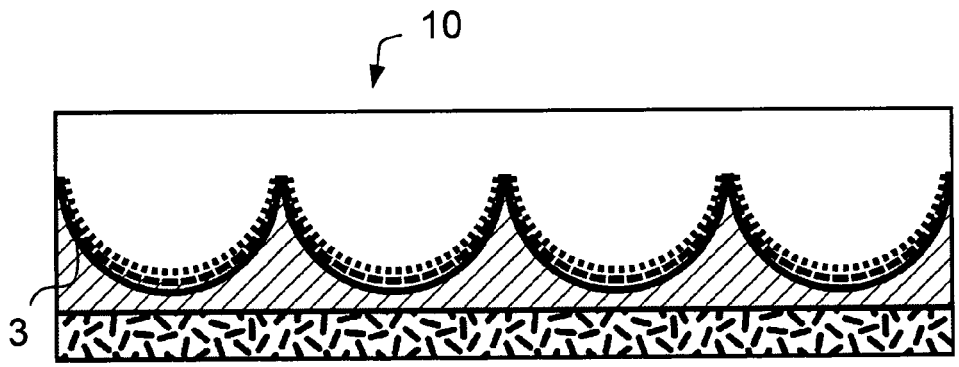
Figure 6:
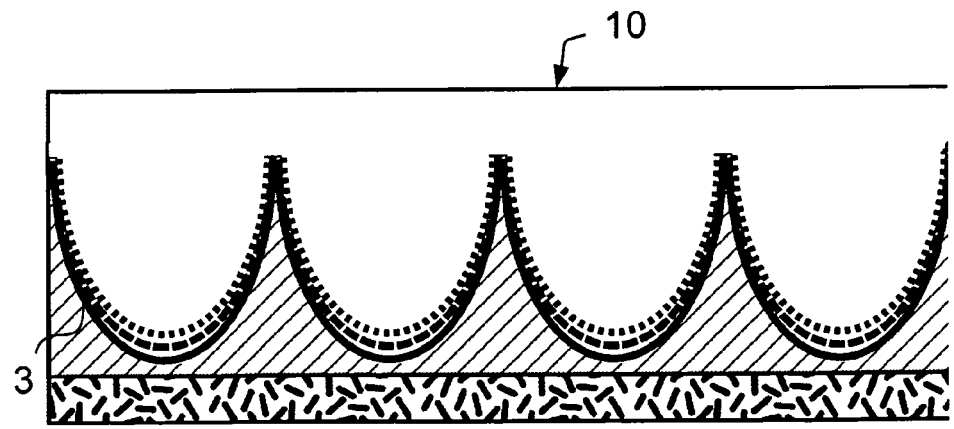

The FIGS. 5 and 6 illustrate how the depth of the microcavities 3 of the microcavity structure 1 can be correspondingly chosen. The depth has an impact on the size of the first region 6 as well as of the second region 7 surrounding it. An individual microcavity 3 is chosen, in a plan view of the surface of the security element 10, i.e. when viewed in the drawing plane of the FIGS. 4 to 7, such that no diffraction effects occur, on the one hand, and an individual microcavity 3 cannot yet be resolved with the unarmed eye, on the other hand. A region between 2 µm and 300 µm fulfills this requirement. An individual microcavity 3 thus acts as an individual pixel. The color that this pixel has depends on the layer structure 13, on the one hand, and on the size ratio between first region and second region, on the other hand. In the first region the layer structure 13 causes a first color effect due to the angles of incidence that are present in the first region 6. The double run through the layer structure 13 at a different angle of incidence in the second region 7 results in a second color effect. Since the microcavities 3 are so small that they cannot be resolved with the eye, an individual microcavity 3 conveys as a result to the viewer a color impression that arises from the mixture of first and second color effect. The mix ratio is specified by the size ratio between first region 6 and second region 7 and thus as a result by the geometry of the microcavity 3.

Figure 7:
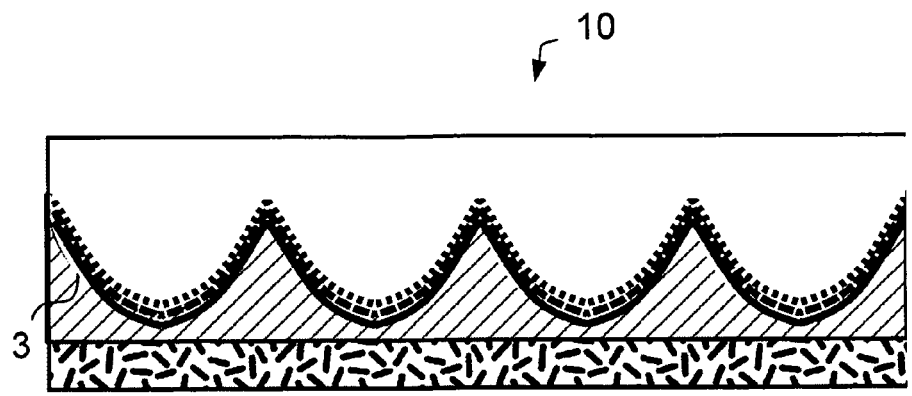

The security element 10, of course, is not limited to a microcavity structure 1 with spherical depressions for the microcavities 3. FIG. 7 shows by way of example an aspherical depression structure for the microcavities 3.

Figure 8:
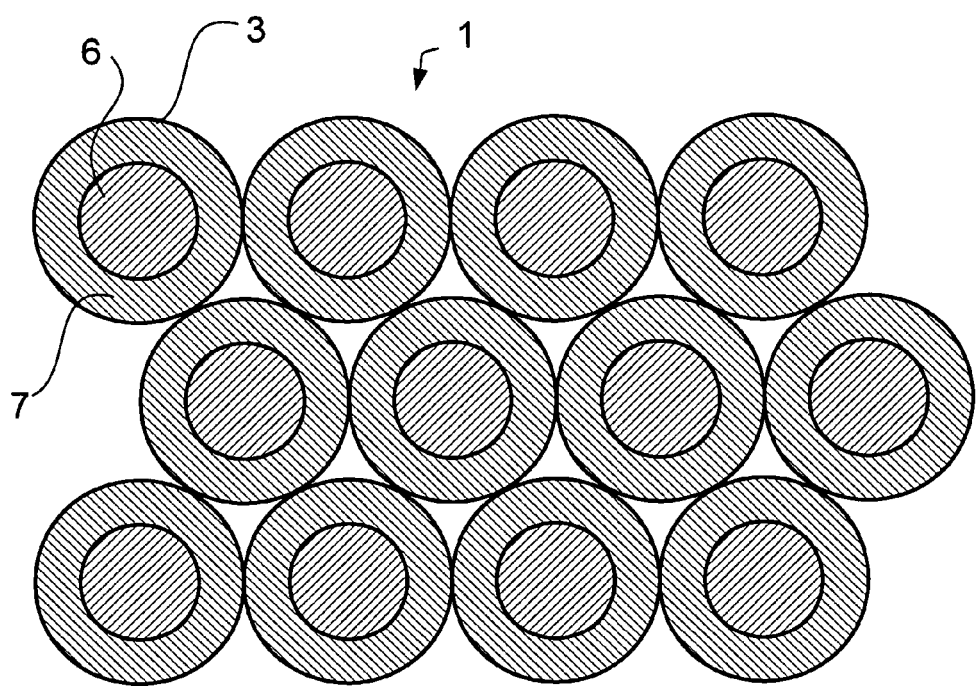

FIG. 8 shows in a plan view the different area portions of the first regions 6 (hatched from the bottom left to the top right) and of the second regions 7 (hatched from the bottom right to the top left) of the microcavities 3 in the microcavity structure 1. A multiplicity of microcavities 3 with first regions 6 and second regions 7 lie side by side. Each microcavity 3 acts as a pixel with the already mentioned color mixture.

Figure 9:
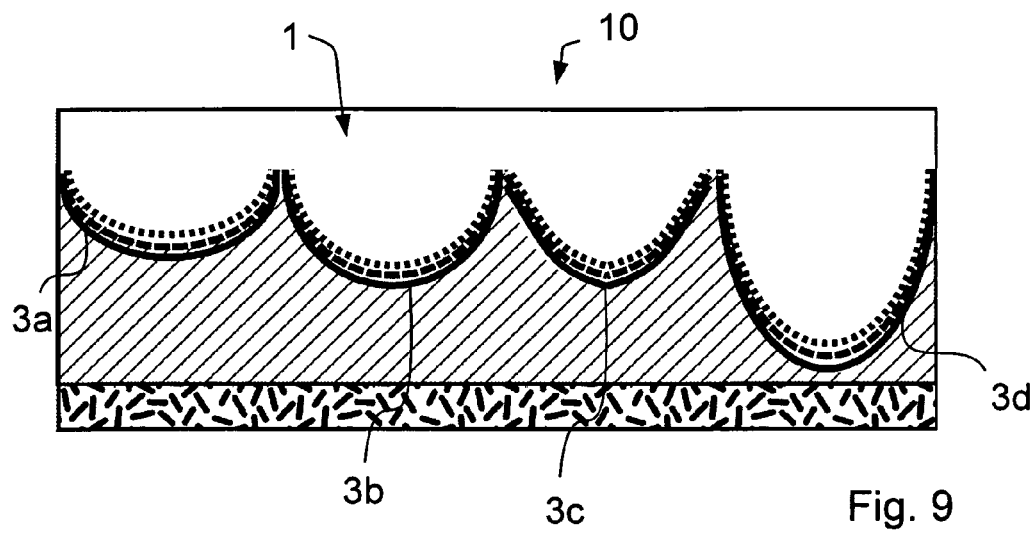
Figure 10:
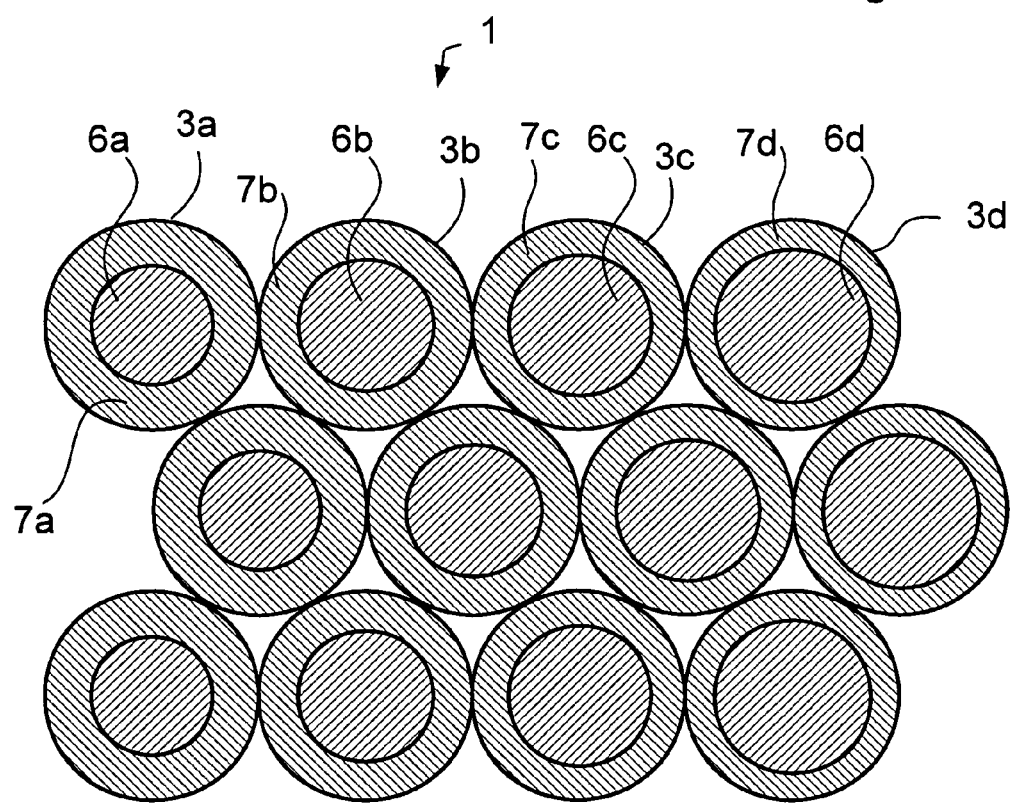

The color of each pixel can be adjusted through different geometries of the microcavities 3 in the microcavity structure 1. This is schematically represented in den FIGS. 9 and 10. FIG. 9 shows a sectional representation corresponding to the FIGS. 4 to 7. Here, the microcavities are now designed with different geometries. By way of example, four microcavities 3a, 3b, 3c and 3d are drawn, whose depths increase. With increasing depth the portion which the first region has in the area of the microcavity to be seen in a plan view alters. Thus the area ratios between first region and second region alter. FIG. 10 shows accordingly that the area ratio between first region 6a and second region 7a at the flattest microcavity 3a is different than at the somewhat deeper microcavity 3b, the significantly deeper microcavity 3c, or the deepest microcavity 3d. Thus, the mix ratio, which ensues between first and second color effect, is different for the four microcavities 3a to 3d and each microcavity conveys to a viewer a different color impression. This makes it possible to design motifs in simple fashion, because only the geometry of the microcavities 3 must be varied in the manufacturing process, e.g. by different exposure intensities in the photolithographic process. The layer structure 13, however, does not have to be varied, it can remain identical for all microcavities 3 of the microcavity structure 1, which is very advantageous from a manufacturing point of view.

The employment of microcavity structures 1 that act as retroreflectors, however, is not limited to rotationally symmetric microcavities. These have the property that the optical effect in two spatial directions is independent of the viewing direction, but also the employment of retroreflectors that only in one spatial direction are insensitive to variations of the viewing direction can achieve a very forgery-resistant security element 10.

Figure 11:
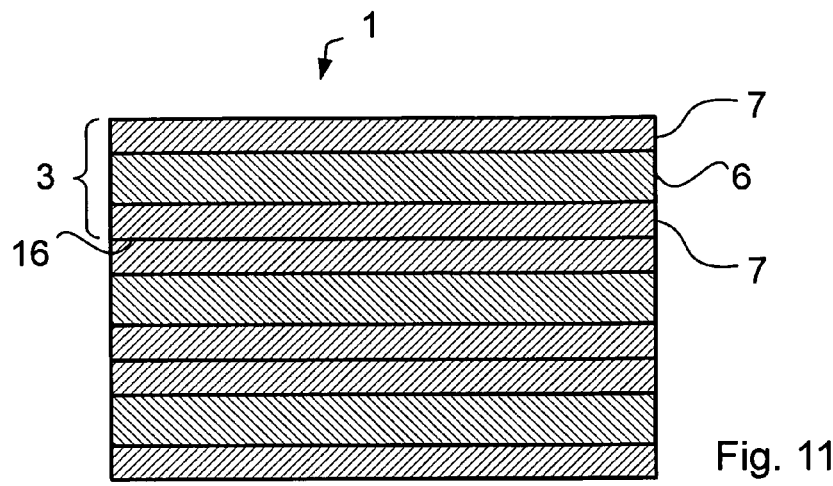

The plan view of a corresponding microcavity structure 1 is shown in FIG. 11. Here, the microcavities 3 are now configured as elongate grooves, which lie side by side. In FIG. 11 there is drawn, for clarity's sake, a border 16 between two neighboring microcavities 3. The microcavity 3 corresponds in a section, that extends vertically in the representation of FIG. 4, to the views as they were shown in the FIGS. 4 to 7 and 9. In the horizontal direction the microcavities are configured as elongate grooves. In this direction they are so long that they can be resolved with the unarmed eye. This is not compulsory, however. The length of at least some grooves can also lie below the recognizability limit.

Figure 12:
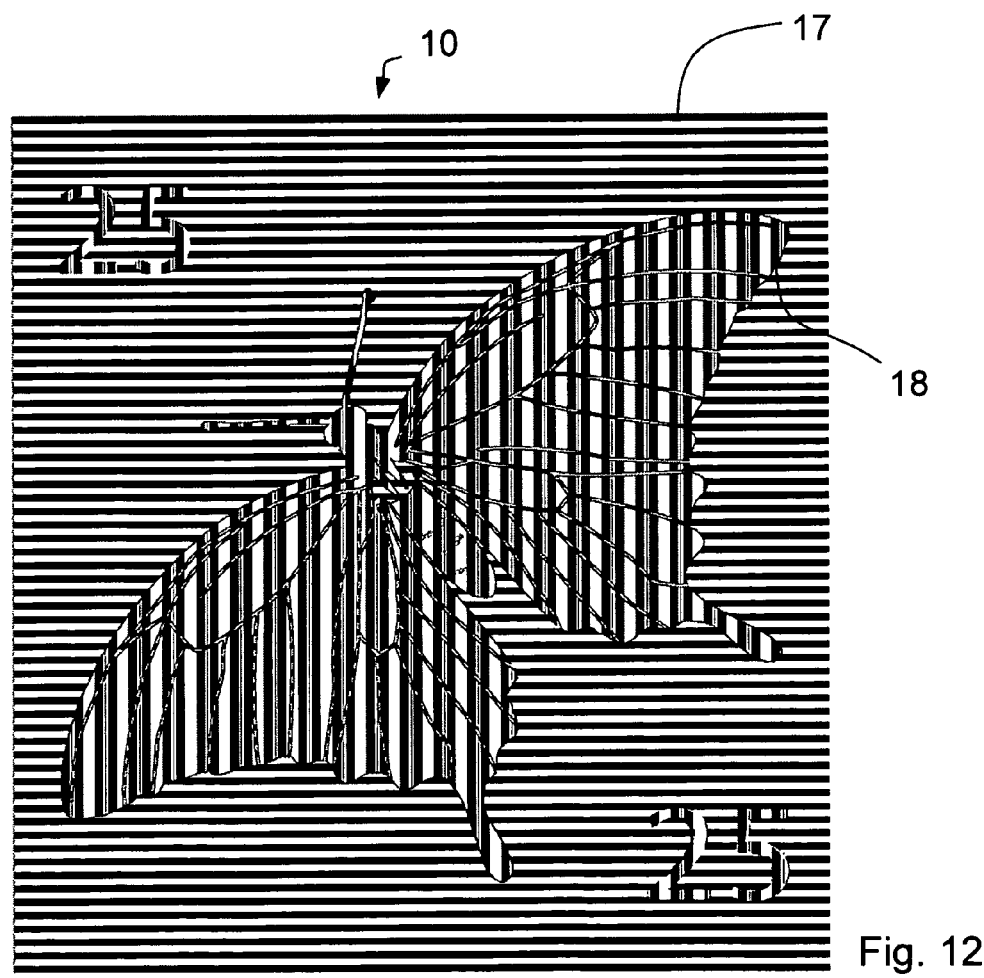

Such a microcavity structure now allows to adjust a color between a motif and its background, which color depends on the viewing direction. Such a security element 10 is represented by way of example in FIG. 12. It comprises regions 17, in which the direction along which the microcavities 3 extend, is for example horizontal.

In regions 18, however, the longitudinal direction of the channel-shaped microcavities 3 is vertical. The cavities of the motif are thus oriented with their main direction perpendicular to the cavities of the background. Each microcavity is now coated such that the pattern upon oblique viewing appears in two colors. Depending on the viewing direction, there is now realized a different color effect, because only for one of the two districts 17 and 18 there occurs the above-mentioned color mixture. If the security element is rotated in the viewing plane by 90°, a color exchange occurs between pattern and background, i.e. between first district 17 and second district or second districts 18.

Figure 13:
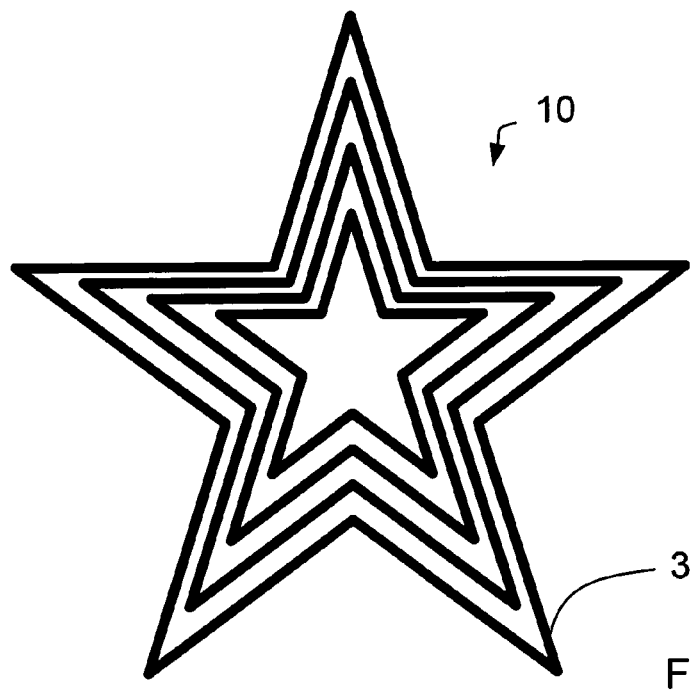
Figure 14:
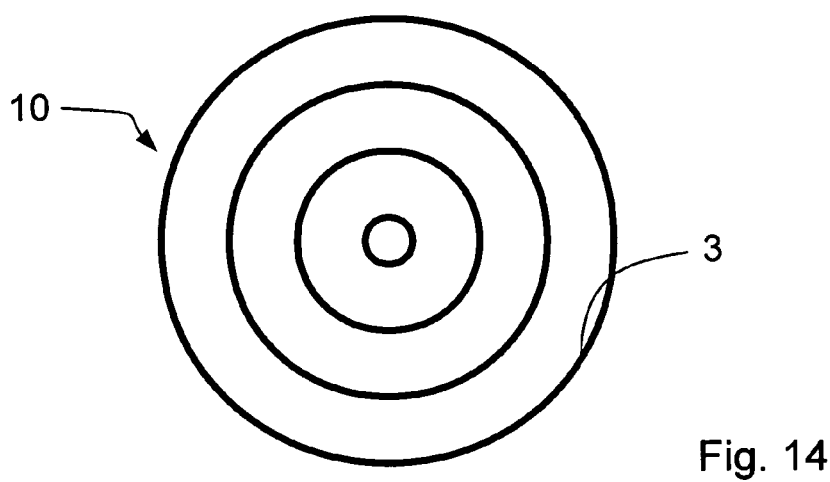

The FIGS. 13 and 14 show that a different orientation of non-rotationally symmetric microcavities 3 is, of course, not limited to mutually perpendicular arrangements. By a continuous variation of the longitudinal direction of such non-rotationally symmetric microcavities 3 there can also be realized pump and run effects. FIG. 13 shows a security element 10 whose microcavity structure 1 is formed by microcavities extending in star-shaped fashion. FIG. 14 serves as a proof of the fact that the microcavities can also be executed in non-straight fashion. In the Figure they are circular by way of example.

Figure 15:
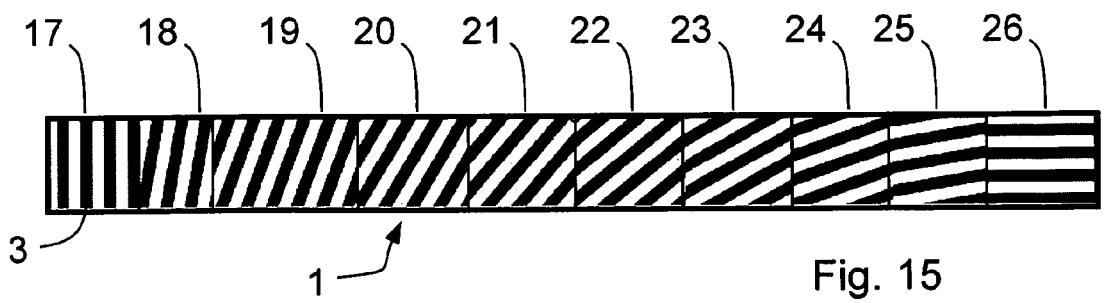

FIG. 15 finally shows a plan view of a microcavity structure 1, which comprises regions 17 to 26, in which the longitudinal direction of the channel-shaped microcavities 3 is varied by 10° relative to the respective next district. The borderlines between the districts are shown in the drawing only for illustration, here.

LIST OF REFERENCE SIGNS 1 microcavity structure
2 substrate
3 microcavity
4 light beam
5 light beam
6 first region
7 second region
8, 9 curve
10 security element
11 substrate
12 embossing lacquer
13 layer structure
14, 15 cover layer
16 border
17 to 26 district

The invention claimed is:

1. A security element for manufacturing value documents, comprising an upper side on which there is formed a microcavity structure that has a multiplicity of adjacent microcavities configured as retroreflectors, wherein on the microcavities there is formed a structure causing a color effect, wherein the microcavities are respectively configured such that they have a first region in which radiation incident on an upper side is singly reflected, and a second region in which radiation incident on an upper side is multiply reflected, and that the structure causing the color effect has a dispersion dependent on an angle of incidence, so that radiation singly reflected at the first region shows a different color effect, when viewed from the upper side, than radiation multiply reflected at the second region.

2. The security element according to claim 1, wherein the structure causing the color effect is configured as a color-shift coating.

3. The security element according to claim 1, wherein the microcavities are configured as spherical, aspherical or elliptical depressions or in the form of a freeform area.

4. The security element according to claim 1, wherein the microcavities are configured as non-rotationally symmetric channel-shaped depressions.

5. The security element according to claim 3, wherein the microcavity structure has several districts in which the respective microcavities are non-rotationally symmetric microcavities that all extend along a main direction, wherein the main directions of the districts differ.

6. The security element according to claim 1, wherein the microcavities have an extent, at least in a direction which is parallel to the surface, which is between 2 μm and 300 μm.

7. A value document having a security element according to claim 1.

8. A manufacturing method for a security element for value documents, wherein a substrate is provided, which has an upper side, on the upper side there is formed a microcavity structure that has a multiplicity of adjacent microcavities configured as retroreflectors, and on the microcavities there is formed a structure causing a color effect, wherein the microcavities are respectively configured such that they have a first region in which radiation incident on an upper side is singly reflected, and a second region in which radiation incident on an upper side is multiply reflected, and that the structure causing the color effect is provided with a dispersion dependent on an angle of incidence, so that radiation singly reflected at the first region shows a different color effect, when viewed from the upper side, than radiation multiply reflected at the second region.

9. The manufacturing method according to claim 8, wherein the structure causing the color effect is configured as a color-shift coating.

10. The manufacturing method according to claim 8, wherein the microcavities are configured as spherical, aspherical or elliptical depressions or in the form of a freeform area.

11. The manufacturing method according to claim 8, wherein the microcavities are configured as non-rotationally symmetric channel-shaped depressions.

12. The manufacturing method according to claim 8, wherein in the microcavity structure there are formed several districts, in which the respective microcavities are non-rotationally symmetric microcavities that all extend along a main direction, wherein the main directions of the districts differ.

13. A security element for manufacturing value documents, the security element comprising:
   a microcavity structure comprising a substrate having formed thereon a plurality of adjacent microcavities configured as retroreflectors, each microcavity having:
      a first region configured such that radiation incident thereon is singly reflected; and
      a second region configured such that radiation incident thereon is reflected multiple times; and
   a layer structure formed on the microcavities so as to cause a color effect, the layer structure having a dispersion that is dependent on an angle of incidence, so that for each microcavity, radiation singly reflected at the first region shows a different color effect than radiation reflected multiple times at the second region.

14. The security element according to claim 13, wherein the layer structure is a color-shift coating.

15. The security element according to claim 13,
wherein the microcavity structure has several districts in which the microcavities are positioned,
wherein the microcavities of each district are non-rotationally symmetric microcavities that all extend along a main direction, and
wherein the main directions of the districts differ.

16. A value document having a security element according to claim 13.

17. A method of manufacturing a security element for value documents, the method comprising:
forming a microcavity structure on a substrate, the microcavity structure bounding a plurality of adjacent microcavities configured as retroreflectors, each microcavity being formed so as to have:
a first region configured such that radiation incident thereon is singly reflected; and
a second region configured such that radiation incident thereon is reflected multiple times; and
forming a layer structure on the microcavities so as to cause a color effect, the layer structure having a dispersion that is dependent on an angle of incidence, so that for each microcavity, radiation singly reflected at the first region shows a different color effect than radiation reflected multiple times at the second region.

* * * * *